(12) United States Patent
Vijayan et al.

(10) Patent No.: US 10,375,544 B2
(45) Date of Patent: Aug. 6, 2019

(54) METHODS AND SYSTEMS OF AN ON-BOARD DIAGNOSTICS PASS-THROUGH DONGLE

(71) Applicants: Jayaprakash Vijayan, Dublin, CA (US); Gurusankar Sankararaman, Dublin, CA (US); Anand Ramakotti, Dublin, CA (US); Sigmundo Bautista, Alameda, CA (US); Robert Kennedy Manoharan, Chennai (IN)

(72) Inventors: Jayaprakash Vijayan, Dublin, CA (US); Gurusankar Sankararaman, Dublin, CA (US); Anand Ramakotti, Dublin, CA (US); Sigmundo Bautista, Alameda, CA (US); Robert Kennedy Manoharan, Chennai (IN)

(*) Notice: Subject to any disclaimer, the term of this patent is extended or adjusted under 35 U.S.C. 154(b) by 0 days.

(21) Appl. No.: 15/687,112

(22) Filed: Aug. 25, 2017

(65) Prior Publication Data

US 2018/0132082 A1 May 10, 2018

Related U.S. Application Data

(63) Continuation-in-part of application No. 15/669,956, filed on Aug. 6, 2017.

(60) Provisional application No. 62/373,348, filed on Aug. 11, 2016.

(51) Int. Cl.
*H04W 4/44* (2018.01)
*H04W 4/80* (2018.01)

(52) U.S. Cl.
CPC ............... *H04W 4/44* (2018.02); *H04W 4/80* (2018.02)

(58) Field of Classification Search
CPC .................................. H04W 4/44; H04W 4/80
See application file for complete search history.

(56) References Cited

U.S. PATENT DOCUMENTS

2016/0323754 A1* 11/2016 Friday ................. H04W 16/28
2017/0164159 A1* 6/2017 Mycek ................. H04W 4/21

* cited by examiner

*Primary Examiner* — Raj Jain
*Assistant Examiner* — Harry H Kim

(57) ABSTRACT

In one aspect, a computerized method useful for implementing location awareness a vehicle coupled with an on-board diagnostics (OBD) pass-through dongle includes the step of providing a plurality of wireless personal area network (WPAN) beacons, wherein plurality of WPAN beacons transmits a low-energy WPAN signal. The computerized method includes the step of pre-mapping a plurality of subareas in the area with a set of signal attributes for each WPAN beacon of the plurality of WPAN beacons. The computerized method includes the step of coupling a vehicle with an OBD pass-through dongle, wherein the OBD pass-through dongle comprises a Low-Power Wide-Area Network (LPWAN) module, and wherein the OBD pass-through dongle comprises a WPAN module. The computerized method includes the step of, with the WPAN module, receiving one or more WPAN signals from the plurality of WPAN beacons.

11 Claims, 6 Drawing Sheets

METHODS AND SYSTEMS OF AN ON-BOARD DIAGNOSTICS PASS-THROUGH DONGLE

This application claims priority to U.S. application Ser. No. 15/669,956 filed on Aug. 6, 2017, and titled METHODS AND SYSTEMS OF A LOCAL VIDEO-HUB DEVICE FOR PUSHING MANAGED VIDEO CONTENT OVER A DISPLAY OF ANOTHER VIDEO SOURCE. U.S. application Ser. No. 15/669,956 claims priority to U.S. Provisional Application No. 62/373,348 filed on Aug. 11, 2016 and titled METHODS AND SYSTEMS OF APPLICATION MANAGEMENT. These applications are incorporated by reference in their entirety.

BACKGROUND

1. Field

This application relates on-board diagnostic systems and more specifically to a system, article of manufacture and method for methods and systems of an on-board diagnostics pass-through dongle.

SUMMARY

In one aspect, a computerized method useful for implementing location awareness a vehicle coupled with an on-board diagnostics (OBD) pass-through dongle includes the step of providing a plurality of wireless personal area network (WPAN) beacons, wherein plurality of WPAN beacons transmits a low-energy WPAN signal. The computerized method includes the step of pre-mapping a plurality of subareas in the area with a set of signal attributes for each WPAN beacon of the plurality of WPAN beacons. The computerized method includes the step of coupling a vehicle with an OBD pass-through dongle, wherein the OBD pass-through dongle comprises a Low-Power Wide-Area Network (LPWAN) module, and wherein the OBD pass-through dongle comprises a WPAN module. The computerized method includes the step of, with the WPAN module, receiving one or more WPAN signals from the plurality of WPAN beacons. The computerized method includes the step of, with the LPWAN module, communicating a LPWAN signal to the on-premises server network in the area, wherein the LPWAN signal comprises the set of signal attributes for each WPAN beacon of the plurality of WPAN beacons as received by the WPAN module. The computerized method includes the step of, with the on-premises server network in the area, matching the set of signal attributes for each WPAN beacon of the plurality of WPAN beacons as received by the WPAN module with the pre-mapped plurality of subareas in the area with the set of signal attributes for each WPAN beacon of the plurality of WPAN beacons to determine a sub area of the vehicle.

Figure 1:
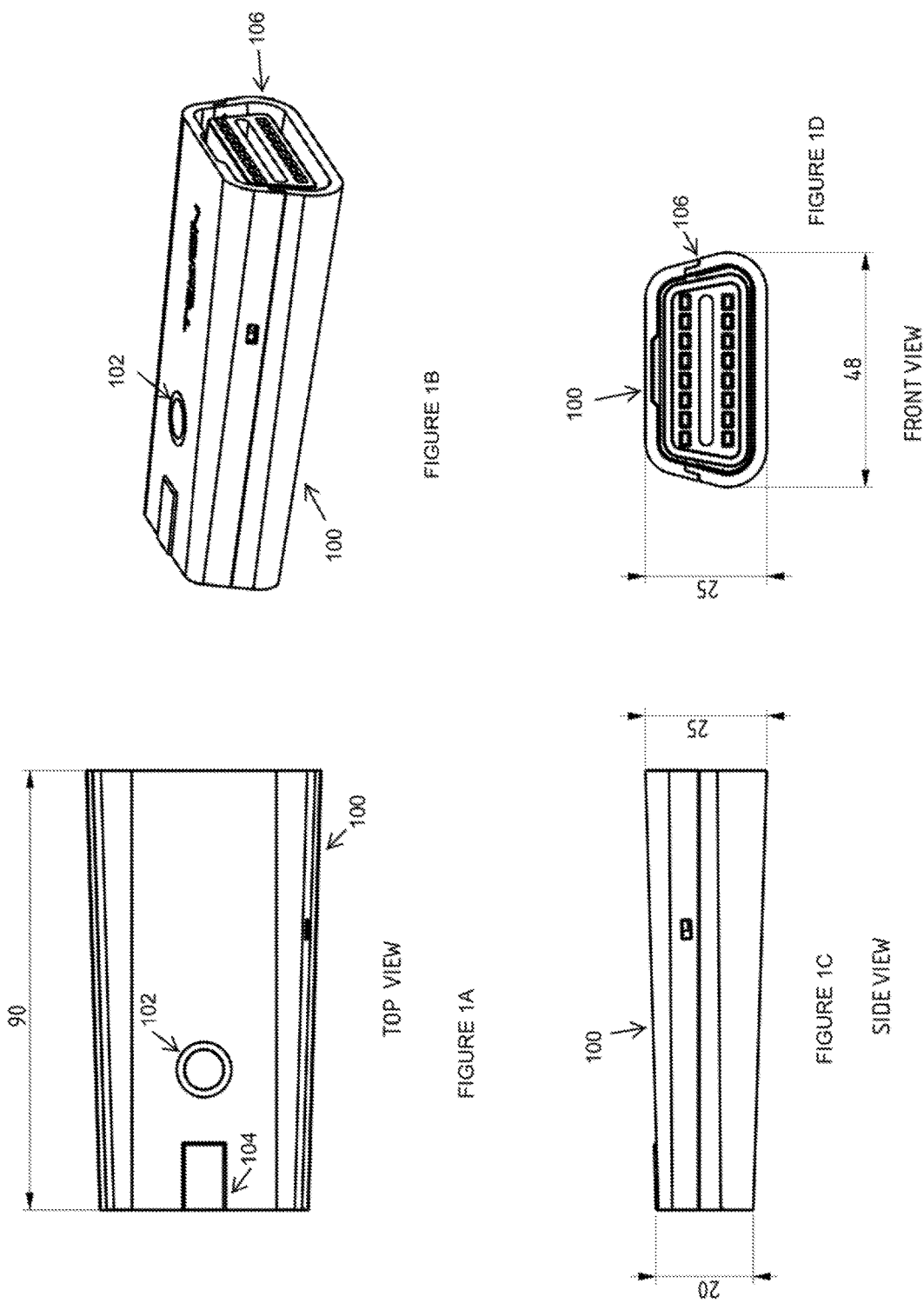
FIGS. 1 A-D illustrate various perspective views of an example OBD pass-through dongle, according to some embodiments.

The Figures described above are a representative set, and are not an exhaustive with respect to embodying the invention.

DESCRIPTION

Disclosed are a system, method, and article of manufacture for methods and systems of an on-board diagnostics pass-through dongle. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

BLUETOOTH® Low Energy (BLE) can be a wireless personal area network technology. BLE can increase in data broadcasting capacity of a device by increasing the advertising data length of low energy BLUETOOTH® transmissions. A mesh specification can enables using BLE for many-to-many device communications for home automation, sensor networks and other applications.

Dongle can be a small piece of hardware that connects to another device to provide it with additional functionality.

Light-emitting diode (LED) can be a two-lead semiconductor light source.

Low-Power Wide-Area Network (LPWAN) and/or Low-Power Network (LPN) is a type of wireless telecommunication wide area network designed to allow long range communications at a low bit rate among things (connected objects), such as sensors operated on a battery. The low power, low bit rate and intended use distinguish this type of network from a wireless WAN that is designed to connect users or businesses, and carry more data, using more power. LoRa can be a chirp spread spectrum (CSS) radio modulation technology for LPWAN. It is noted that various other LPWAN networks can be utilized in various embodiments in lieu of a LoRa network and/or system.

On-board diagnostics (OBD) can be a system that leverages a vehicle's self-diagnostic and reporting capability. OBD systems provide the vehicle owner, repair technician and the like, access to the status of the various vehicle subsystems.

Pairing can be the linking together of devices to allow communications between them.

Printed circuit board (PCB) can mechanically support and electrically connect electronic components using conductive tracks, pads and other features etched from copper sheets laminated onto a non-conductive substrate. Components (e.g. capacitors, resistors or active devices) are generally soldered on the PCB. Advanced PCBs may contain components embedded in the substrate.

Exemplary Computer Architecture and Systems

An OBD pass-through dongle is provided. The OBD pass-through dongle can include an LED flash light. The OBD pass-through dongle can implemented automatic pairing with other computing device (e.g. via quick pairing methods, etc.). The OBD pass-through dongle can include various system for location awareness. OBD pass-through dongle has a OBD pass through port. The data read from the OBD port of the vehicle can be analyzed and also passed through a OBD female connector port. This can enable a OBD pass-through dongle enabled system to connect with various third-party devices over such that that existing devices and OBD scanners can work without replacing our device. This data can also be sniffed by OBD pass-through dongle and communicated to a server to analyze the communication (in real-time (e.g. assuming networking and/or processing latencies, etc.) and/or non-real-time). This can be implemented between the vehicle and third-party OBD devices and scanners.

FIGS. 1 A-D illustrate various perspective views of an example OBD pass-through dongle 100 of an, according to some embodiments. FIGS. 1 A-C provide example dimensional measurements in centimeters as shown. These dimensional measurements are provided by way of example and not of limitation as other example embodiments can include other dimensional measurements. More specifically, FIG. 1A illustrates an example of top view of OBD pass-through dongle 100. As shown, OBD pass-through dongle 100 can include a control button 102. Control button 102 can be a physical button that triggers various events based on specified inputs. For example, a single press can cause OBD pass-through dongle 100 to initiate a pairing with a local smart phone (and/or other mobile device) application. A double press can cause OBD pass-through dongle 100 to turn on an LED flash light in a connector portion of OBD pass-through dongle 100 and/or around control button 102. OBD pass-through dongle 100 can include indention 104. Indention 104 can be an indentation on pass-through dongle 100 which locks the (male) device to the vehicle (female) OBD port as a self-securing mechanism of the OBD port. FIG. 1B illustrates an example of side/top view of OBD pass-through dongle 100. OBD pass-through dongle 100 can include a female connector (e.g. a type A connector, a type B connector, etc.) portion 106 as shown. FIG. 1C illustrates an example of side view of OBD pass-through dongle 100. FIG. 1D illustrates an example of front view of OBD pass-through dongle 100.

Figure 2:
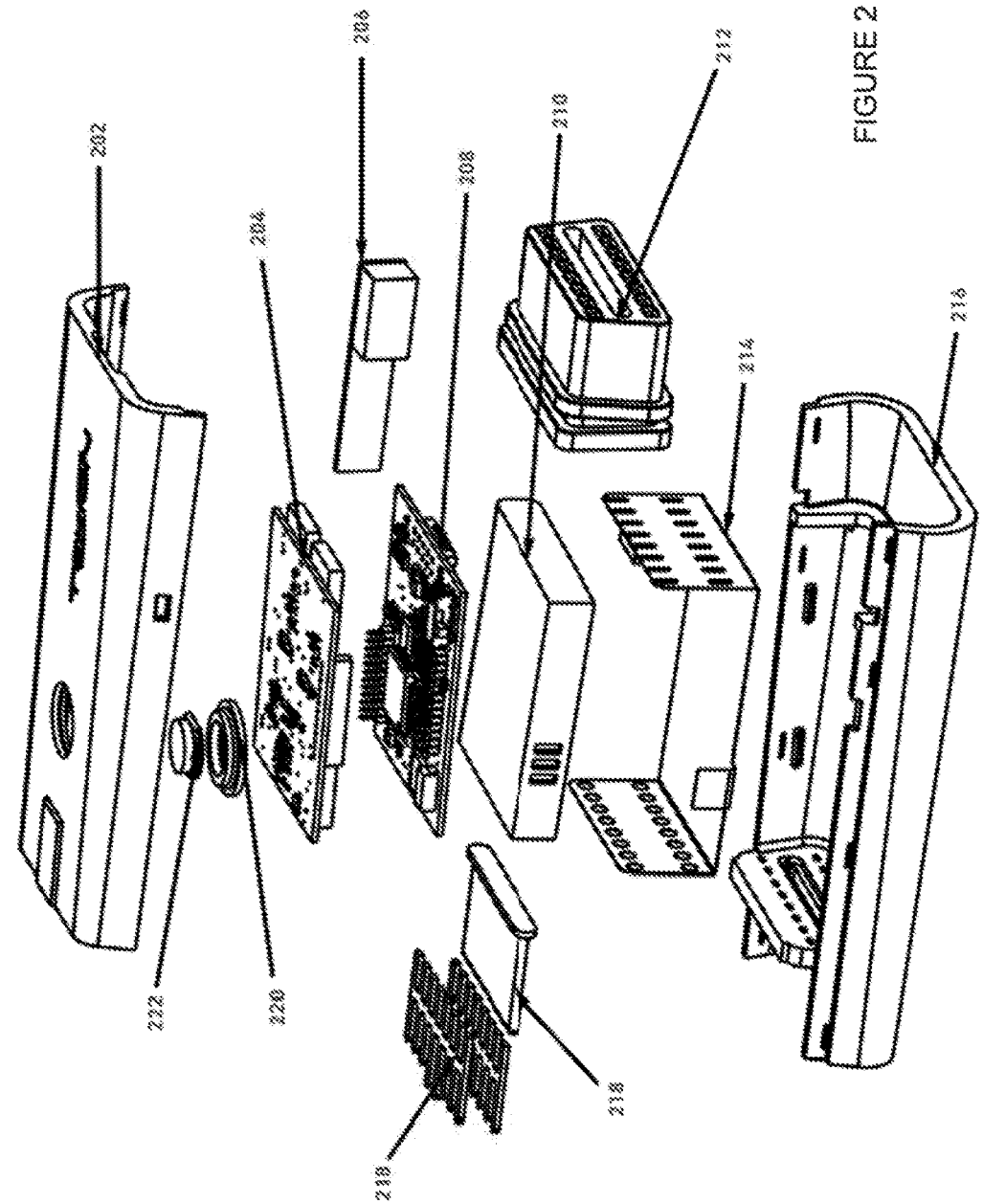
FIG. 2 depicts an exemplary computing system that can be configured to perform any one of the processes provided herein.

FIG. 2 illustrates an example exploded view of OBD pass-through dongle 200, according to some embodiments. OBD pass-through dongle 200 can include top cover 202. Top cover 202 can be rigid and durable material such as, inter alia: metal (e.g. stainless steel, titanium, aluminum or any metal alloy), rigid fabric, carbon fiber, epoxy resin, graphite, rubber, plastic or any combination of thereof. It is noted that other rigid elements of OBD pass-through dongle 200 can be made of these materials as well.

OBD pass-through dongle 200 can include PCB 1 204. PCB 1 204 can be coupled with LoRa antenna 206. PCB 1 204 can be coupled, inter alia, with PCB 2 208. Battery 210 can provide power to the various electrical components of OBD pass-through dongle 200. Battery 210 can be rechargeable. OBD female connector 212 can be a receptacle that receives and holds the male connector of another OBD and/or other relevant device. In this way, OBD pass-through dongle 200 can pass through data from a vehicle's OBD system to said another OBD and/or other relevant device. Flex PCB 212 can enclose and support various other elements of OBD pass-through dongle 200 as shown. In some example embodiments, PCB1 204 can include a LoRa module/chip (and/or other a Low-Power Wide-Area Network (LPWAN) module) and a BLE module/chip (and/or other wireless personal area network (WPAN) module). PCB 2 208 can include an OBD chip and a microcontroller.

LED connector light can be composed of light guide 218. Light guide 218 can include an LED light and powered by battery 210. Likewise, light right 222 can include an LED light and powered by battery 210. Switch 222 can be a mechanical switch used to implement control button 102. In one example, LED connector light can be an LED flashlight that can be used to illuminate an OBD port in a vehicle. This can be helpful for a user connecting the device to the car. LED connector light can be located in-between the connectors. The button to switch on the flashlight is placed on top of the device as shown in the figure (e.g. control button 102). Pins 220 can be a portion of the male connector.

OBD pass-through dongle 200 can include receiver and transceiver systems (e.g. BLE transmitter and receiver systems). OBD pass-through dongle 200 can include a BLE module. OBD pass-through dongle 200 can include a LoRa module.

It is noted that, in one example embodiment, OBD pass-through dongle 200 can have a compact form-factor with having the male OBD port, OBD chip, female passthru, LoRa chip, two (2) BLE chips, and an antenna.

Figure 3:
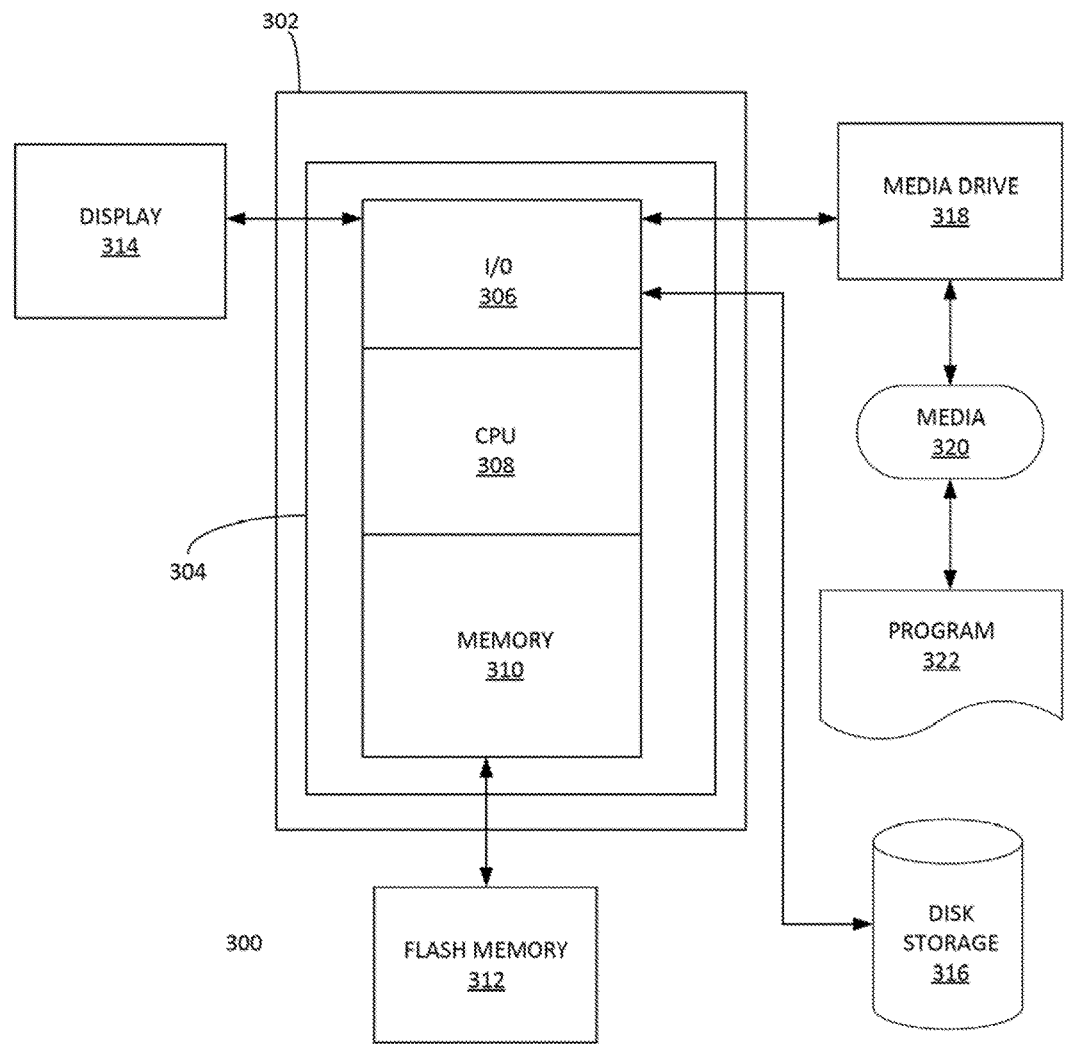
FIG. 3 is a block diagram of a sample-computing environment that can be utilized to implement various embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 4:
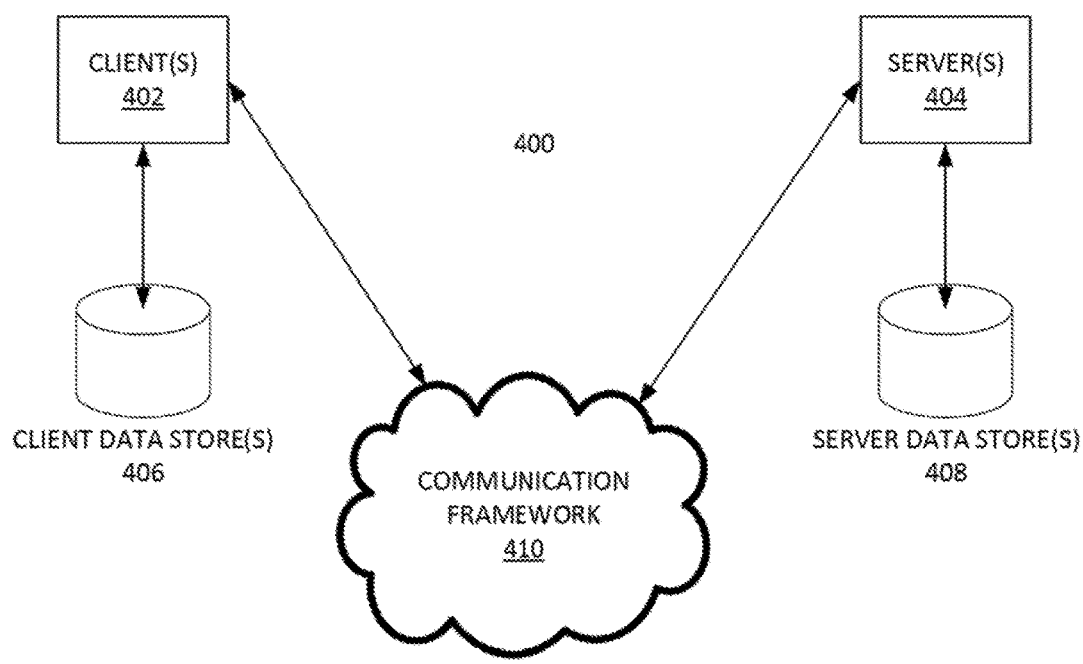
FIG. 4 is a block diagram of a sample-computing environment that can be utilized to implement various embodiments.

FIG. 4 is a block diagram of a sample-computing environment 400 that can be utilized to implement various embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404. In some embodiments, system 400 can instead be a collection of remote computing services constituting a cloud-computing platform.

Figure 5:
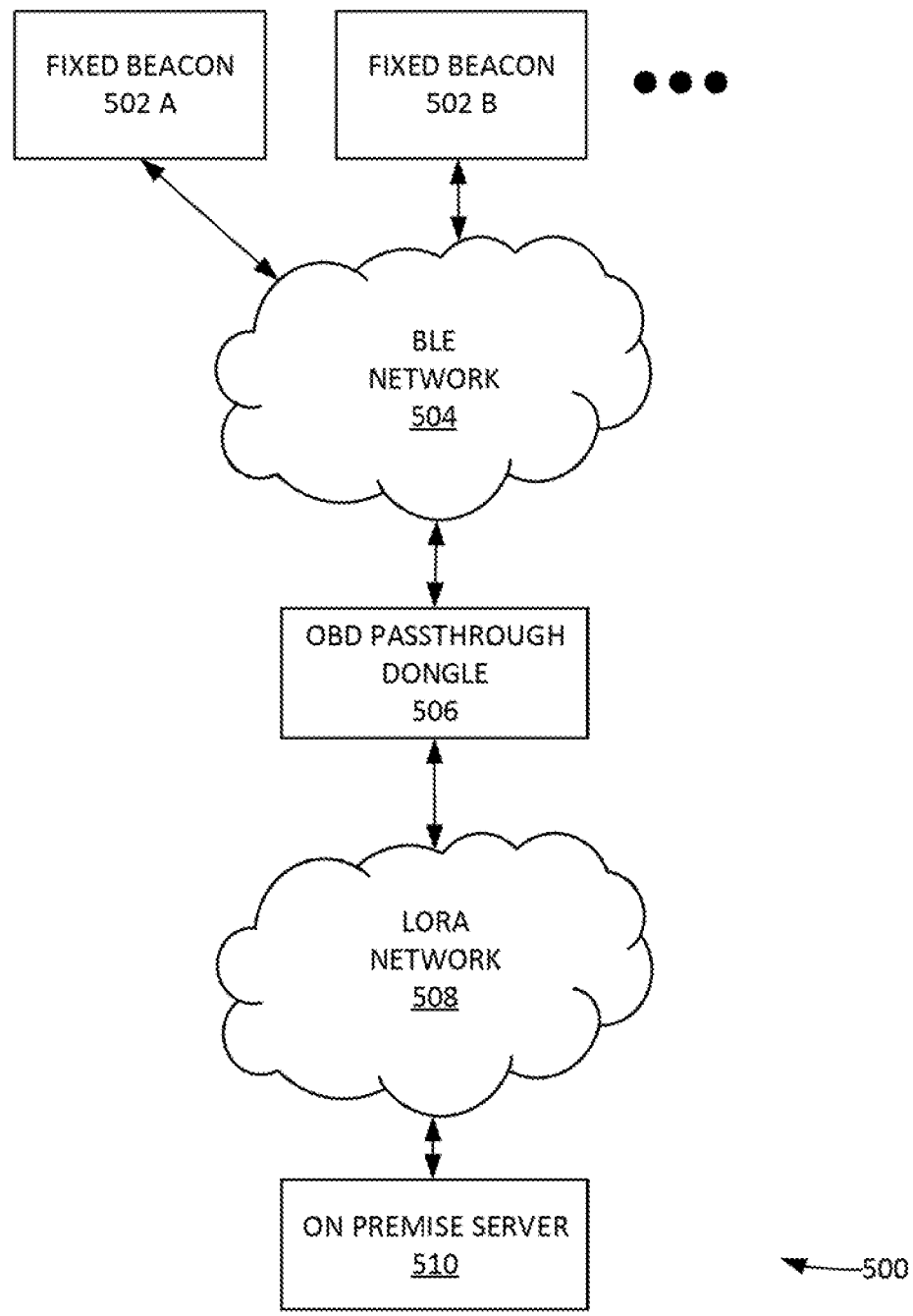
FIG. 5 illustrates an example network for implementing location awareness with an OBD passthrough dongle, according to some embodiments.

FIG. 5 illustrates an example network 500 for implementing location awareness with an OBD passthrough dongle 506, according to some embodiments. OBD passthrough dongle 506 can include both long range and short range wireless technologies (e.g. LoRa modules, BLE modules, etc.). These can be used to bring location awareness to both indoor and outdoor vehicles. OBD passthrough dongle 506 can be coupled with an OBD port of a vehicle. OBD passthrough dongle 506 can receive location beacon signals from various fixed beacons 502 A-B in a geographic area covered by the range of BLE network 504. The location of fixed beacons 502 A-B is known. Various signal attributes of fixed beacons 502 A-B signals such as, inter alia: strength, directionality, etc. can be maintained in a table by on-premise server(s) 510. These signal attributes can be matched with a sub-area of the geographic area. In this way, on-premise server 510 can determine specific sub-area where OBD passthrough dongle 506 is located (e.g. In a specified lot of an automobile dealership, in a repair area, etc.). Fixed beacons 502 A-B can have a specified directionality such that OBD passthrough dongle 506 can only sense a particular fixed beacon if it is located in a specified sub area. For example, a fixed beacon can emit a directional signal into a vehicle repair area of an automobile dealership.

As noted supra, OBD passthrough dongle 506 can include both receiver and transceiver modules. In the present example OBD passthrough dongle 506 can receive BLE signals and/or send out LoRa signals. Accordingly, OBD passthrough dongle 506 can communicatively couple with an on-premise server system 508 via LoRa network 510. It is noted that network 500 can include a plurality of on-premise servers. Accordingly, each OBD passthrough dongle 506 can be assigned a specified on-premise server system. For example, when a customer checks a vehicle into the automobile dealership, the customer can plug in OBD passthrough dongle 506 into the vehicle's OBD port. OBD passthrough dongle 506 can then communicatively couple with a pre-assigned on-premise server system 510 and/or be assigned an on-premise server at that time. On-premise server system 510 can be communicatively coupled with various server entities implemented in a cloud-computing platform. These entities can be used to manage various functionalities of on-premise server system 510. For example, cloud-based servers can implement location analysis, messaging functionalities, communication to smart phone applications, OBD passthrough dongle management/analysis, etc.

OBD passthrough dongle 506 can communicate other vehicle OBD-related data to on-premise server system 510. OBD passthrough dongle 506 can communicate this information on a periodic basis (e.g. every two minutes, etc.) and/or upon a specified trigger event (e.g. OBD accelerometer parameters exceeding a pre-specified value, OBD battery levels decreasing passed a specified value, etc.). Example periodically communicated data can include, inter alia: OBD accelerometer information, OBD battery level information, ambient vehicle temperature information, other vehicle information, etc. In one example, this data can be used for vehicle security purposes. For example, if a vehicle is not designated to be moved during a period and vehicle motion is detected, an alert to a specified administrator at a vehicle dealership or repair shop can be generated and sent to the administrator's smart phone.

OBD passthrough dongle 506 can also use either BLE network 504 and/or LoRa network 508 (and/or other local area wireless networks) to communicate with service provider smart phones. These signals can be used by a vehicle location application that enables the service provider to locate the vehicle with the sub area. This can be implemented when OBD passthrough dongle 506 and/or the service provider's smart phone application detect that the smart phone is within pairing range of OBD passthrough dongle 506.

In one example, the BLE module of OBD passthrough dongle 506 can enable the vehicle location application to automatically pair and receive OBD data. Upon clicking the control button 102 on OBD passthrough dongle 506, it automatically connects with the smartphone and sends the vehicle's diagnostic data. It is noted that OBD passthrough dongle 506 does not need any separate button clicks from the smartphone for pairing with OBD passthrough dongle 506. The nearest OBD passthrough dongle 506 can be automatically paired with the smartphone application.

In some embodiments, systems 300, 400 and 500 can be utilized by an OBD pass-through dongle. For example, system 300 can be incorporated into a computing system in OBD pass-through dongle. System 400 can be a computer network accessible by OBD pass-through dongle. Other computer networks accessible by OBD pass-through dongle can include, inter alia, Wi-Fi networks, LoRa-based networks (e.g. Low Power Wide Area Network (LPWAN), etc.), and the like. A LoRa-based network can be a Low-Power Wide-Area Network (LPWAN) or Low-Power Network (LPN). The LoRa-based network can a type of wireless telecommunication wide area network designed to allow long range communications at a low bit rate among things (connected objects), such as sensors operated on a battery. The low power, low bit rate and intended use distinguish this type of network from a wireless WAN that is designed to connect users or businesses, and carry more data, using more power. An LPWAN may be used to create a private wireless sensor network, but may also be a service or infrastructure offered by a third party, allowing the owners of sensors to deploy them in the field without investing in gateway technology. It is noted that various functionalities of systems 100-500 can be implemented as virtual systems and/or in a cloud-computing platform, according to some embodiments.

Exemplary Methods

Figure 6:
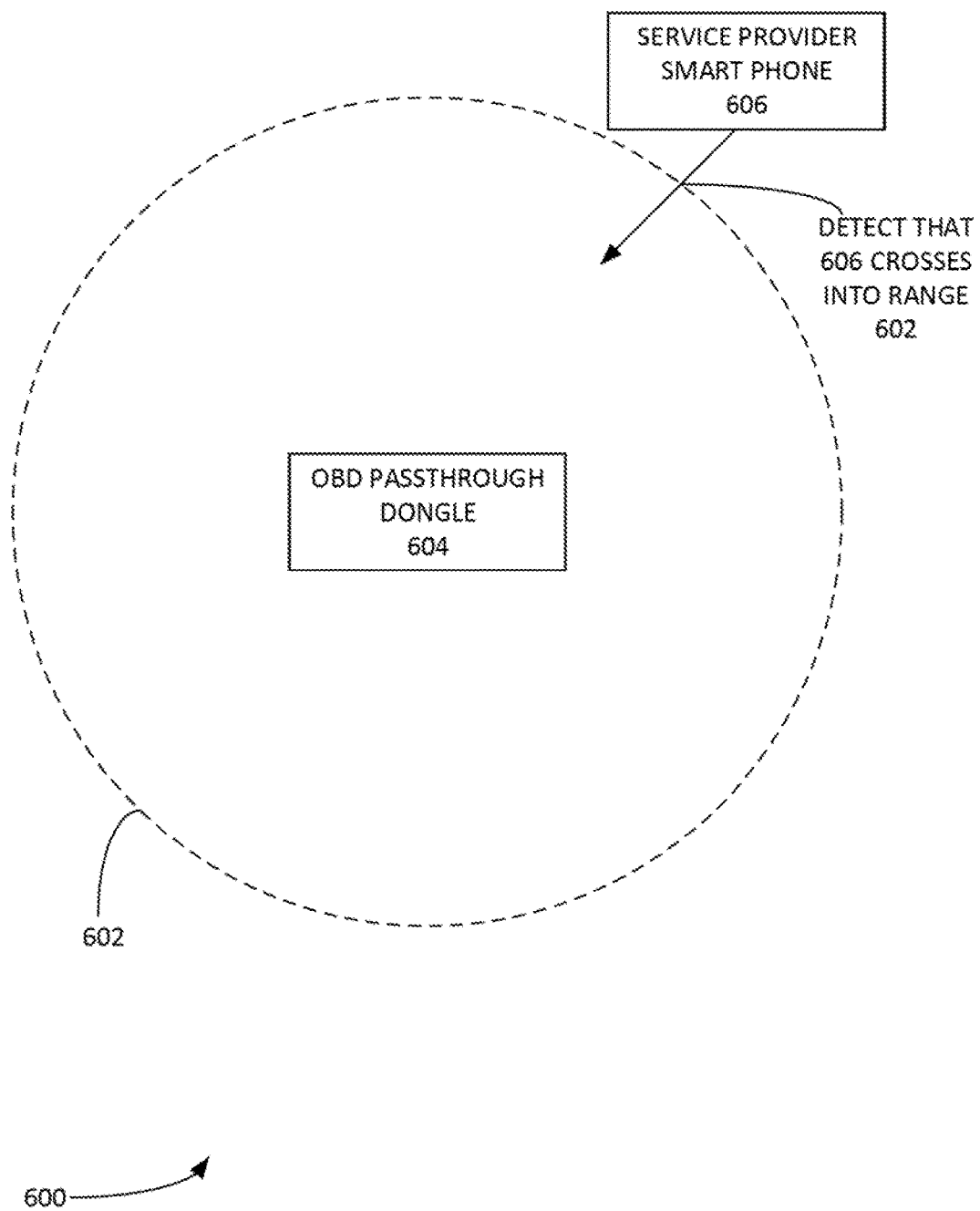
FIG. 6 illustrates an example process of enabling vehicle location with a BLE module of an OBD passthrough dongle, according to some embodiments.

FIG. 6 illustrates an example process 600 of enabling vehicle location with a BLE module of an OBD passthrough dongle 604, according to some embodiments. The vehicle location application of a service provider's smart phone 606 can detect that it passes within the BLE signal range 602. In step 608, it can automatically pair and receive OBD data from a OBD passthrough dongle 604. The strength of the BLE signal can be used by service provider's smart phone 606 to locate OBD passthrough dongle 604 and thus the associated vehicle.

In one example, process 600 can be used for locating vehicle and other items on the premises of a vehicle dealership. OBD passthrough dongle 604 has a BLE receiver that listens to various pre-located fixed BLE Beacon devices. OBD passthrough dongle 604 receives a signal strength from nearby beacon devices and then it transmits the signal strength to an on-premise server through a LoRa network. The on-premise server receives the data from OBD passthrough dongle 604 and process it to find the exact location of the vehicle or other item. A service provider's smart phone can receive a message with area location of OBD passthrough dongle 604. The service provider can then arrive at the area identified in the message and use process 600 to obtain a more refined and specific location of the vehicle.

Additional OBD Passthrough Dongle Implemented Methods

In one example method, OBD passthrough dongle process, a vehicle arriving for service to an automobile dealership or repair shop can be automatically checked-in using an OBD passthrough dongle. The OBD passthrough dongle can be plugged into the vehicles' OBD port. The OBD passthrough dongle can obtain the vehicle's diagnostic data and prefill all information needed for check-in in the vehicle. In one example, the OBD passthrough dongle can directly communicate with a smart phone of a service provider/ advisor using a BLE network. In another example, the OBD passthrough dongle can communicate this data to an on-premises server. In yet another example, the OBD passthrough dongle can indirectly communicate with a system implemented in a cloud-computing platform using a Wireless LAN and/or other WAN technologies to access the Internet.

In another example process, an OBD passthrough dongle can be used to generate an automatic estimate of service/repair costs. As provided supra, the OBD passthrough dongle can be used to pass the diagnostic data to service advisor's computing system. The OBD passthrough dongle can read the VIN, DTC codes, odometer, etc. Along with the diagnostic data, this information can be used by a cost-estimating functionality to automatically create a service estimate. The service estimate can be sent to the customer via email, text message, mobile-device application push notification, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method useful for implementing a location awareness vehicle coupled with an on-board diagnostics (OBD) pass-through dongle comprising providing a plurality of wireless personal area network (WPAN) beacons, wherein the plurality of the WPAN beacons transmits a low-energy WPAN signal;

pre-mapping a plurality of subareas in an area with a set of signal attributes for each WPAN beacon of the plurality of the WPAN beacons;

coupling the vehicle with the OBD pass-through dongle, wherein the OBD pass-through dongle comprises a Low-Power Wide-Area Network (LPWAN) module, and wherein the OBD pass-through dongle comprises a WPAN module;

with the WPAN module, receiving one or more WPAN signals from the plurality of the WPAN beacons;

with the LPWAN module, communicating a LPWAN signal to a on-premises server network in the area, wherein the LPWAN signal comprises the set of signal attributes for each WPAN beacon of the plurality of the WPAN beacons as received by the WPAN module; and with the on-premises server network in the area, matching the set of signal attributes for each WPAN beacon of the plurality of the WPAN beacons as received by the WPAN module with the pre-mapped plurality of the subareas in the area with the set of signal attributes for each WPAN beacon of the plurality of the WPAN beacons to determine a sub area of the vehicle.

2. The computerized method of claim 1, wherein the on-board diagnostics pass-through dongle is coupled with an OBD port of the vehicle.

3. The computerized method of claim 1, the LPWAN network comprises a LoRa* network.

4. The computerized method of claim 1, wherein the WPAN network comprises a BLUETOOTH® Low Energy (BLE) network.

5. The computerized method of claim 1, wherein the set of the signal attributes for each WPAN beacon of the plurality of the WPAN beacons comprises a signal strength and a signal direction of each WPAN beacon in the subarea.

6. The computerized method of claim 1, wherein the area comprises an automobile dealership premises.

7. The computerized method of claim 6, wherein the subarea comprises a portion of a parking lot of the dealership premises.

8. The computerized method of claim 1, wherein the on-premises server network maintains a table of the pre-mapped plurality of the subareas with the set of the signal attributes for each WPAN beacon of the plurality of the WPAN beacons.

9. The computerized method of claim 1, wherein the OBD pass-through dongle communicates OBD-related data to on-premises server.

10. The computerized method of claim 9, wherein the OBD-related data comprises an OBD accelerometer information, an OBD battery level information, and an ambient vehicle temperature information.

11. The computerized method of claim 1, wherein the OBD pass-through dongle detects that a service provider's smart phone is within a specified pairing range of the OBD pass-through dongle and communicates an electronic message to the smart phone notifying the service provider that the service provider's smart phone is within the specified pairing range.

* * * * *